United States Patent
Krietsch et al.

(10) Patent No.: US 8,454,861 B2
(45) Date of Patent: Jun. 4, 2013

(54) OPTICALLY VARIABLE PIGMENTS OF HIGH ELECTRICAL CONDUCTIVITY

(75) Inventors: Burkhard Krietsch, Dieburg (DE); Matthias Kuntz, Seeheim-Jugenheim (DE); Reinhold Rueger, Roedermark (DE)

(73) Assignee: Merck Patent GmbH, Darmstadt (DE)

( * ) Notice: Subject to any disclaimer, the term of this patent is extended or adjusted under 35 U.S.C. 154(b) by 287 days.

(21) Appl. No.: 12/809,413

(22) PCT Filed: Dec. 11, 2008

(86) PCT No.: PCT/EP2008/010528
§ 371 (c)(1),
(2), (4) Date: Jun. 18, 2010

(87) PCT Pub. No.: WO2009/077122
PCT Pub. Date: Jun. 25, 2009

(65) Prior Publication Data
US 2010/0258769 A1    Oct. 14, 2010

(30) Foreign Application Priority Data
Dec. 19, 2007 (DE) .......... 10 2007 061 692

(51) Int. Cl.
*H01B 1/08* (2006.01)
(52) U.S. Cl.
USPC .................. 252/520.1; 252/521.3
(58) Field of Classification Search
USPC .......... 252/520.1, 521.3
See application file for complete search history.

(56) References Cited

U.S. PATENT DOCUMENTS

| | | | |
|---|---|---|---|
| 5,320,781 A | | 6/1994 | Stahlecker et al. |
| 5,945,035 A | * | 8/1999 | Vogt et al. .................. 252/520.1 |
| 6,221,144 B1 | * | 4/2001 | Dietz et al. .................... 106/417 |
| 2004/0170838 A1 | * | 9/2004 | Ambrosius et al. ........... 428/406 |
| 2005/0013934 A1 | * | 1/2005 | Xiong et al. .................. 427/212 |
| 2010/0270510 A1 | * | 10/2010 | Krietsch et al. .............. 252/500 |

FOREIGN PATENT DOCUMENTS

| | | |
|---|---|---|
| DE | 0139557 A1 | 5/1985 |
| DE | 0359569 A2 | 3/1990 |
| DE | 4237990 A1 | 5/1994 |
| DE | 10148055 B4 | 7/2002 |
| EP | 0944097 A1 | 9/1999 |

OTHER PUBLICATIONS

World IP Organization. "International Search Report." PCT/EP2008/010528, Applicant: Merck Patent Gmbh, Examiner: Eric Siebel, Mailed: Nov. 23, 2009.
Glausch, R. et al. "Neuartige helle, leitfaehige Pigmente auf Glimmer/Metalloxid-Basis." (Farbe & Lack), Jun. 1990, vol. 96 No. 6.
ESPACENET Database. "Engish Abstract-Electroconductive pigment, used for pigmenting lacquer, printing ink, plastics system or coating, is mixed oxide based on zinc and/or tin and doped with tungsten and/or molybendum, optionally as coating on substrate." DE10148055B4, Applicant: Merck Patent Gmbh. Jul. 18, 2002.

* cited by examiner

*Primary Examiner* — Mark Kopec
(74) *Attorney, Agent, or Firm* — Millen, White, Zelano & Branigan, P.C.

(57) ABSTRACT

The present invention relates to optically variable pigments of high electrical conductivity which comprise a flake-form substrate, which essentially consists of silicon dioxide and/or silicon oxide hydrate, and an electrically conductive layer surrounding the substrate, to a process for the preparation thereof, and to the use of pigments of this type.

10 Claims, No Drawings

OPTICALLY VARIABLE PIGMENTS OF HIGH ELECTRICAL CONDUCTIVITY

The present invention relates to optically variable pigments of high conductivity which comprise a flake-form substrate, which essentially consists of silicon dioxide and/or silicon oxide hydrate, and an electrically conductive layer surrounding the substrate, to a process for the preparation thereof, and to the use of pigments of this type.

Traditionally, colouring in industrial applications, such as inks, in particular printing inks, paints, plastics, ceramic materials and the like, is frequently carried out using pearlescent pigments, which, besides desired colour effects, can produce, in particular, a high gloss effect, a subtle shimmer and weak colour which varies depending on the angle. Since they are particularly readily miscible with other organic or inorganic colorants owing to their high transparency, many different industrial applications based on such mixtures are common.

Particularly in recent years, pigments which have colour properties which vary depending on the viewing angle (colour flop, optically variable behaviour) have entered the field of interest for a wide variety of possible applications. Such properties are obtainable with the pigment types mentioned above if the substrates and the layers located thereon meet strict quality requirements, in particular with respect to smoothness and uniformity of the applied layers, low porosity of the coatings and high transparency of the layers at the same time as perfect matching of the individual layer thicknesses to one another.

Also known are functional pigments which are electrically conductive and come in useful, in particular, in industrial applications. These pigments consist either of electrically conductive materials or comprise the latter in a coating on a support material. The support materials here may adopt various geometrical shapes.

For example, electrically conductive pigments based on transparent flake-form substrates, such as $(SbSn)O_2$-coated mica or mica which has a single- or multilayered dielectric coating and an outer $(SbSn)O_2$ layer on top, are known. These pigments have the advantage over the materials traditionally employed as electrically conductive pigments, such as carbon black or graphite, that they have a pale to whitish or pale-grey colour and thus do not excessively impair the optical impression of the application medium. Introduced into various application media, they can contribute to the formation of an electrically conductive coating, for example in plastic articles, floorcoverings and the like, and are commercially available (for example from Merck KGaA under the name Minatec® 31CM or Minatec® 30 CM). They are described, for example, in the patents DE 38 42 330, DE 42 37 990, EP 0 139 557, EP 0 359 569 and EP 0 743 654.

Since they are very substantially transparent, they are also readily miscible with particulate or dissolved colorants, in particular with coloured pigments, if the application medium is to have optically attractive colours. The greater the desired chroma, however, the greater the proportion of colouring pigments that has to be selected, with a proportionate reduction in electrically conductive pigments occurring in the application medium. The formation of conduction pathways is thus prevented or the latter are frequently interrupted, resulting in a reduction in the electrical conduction capacity in the application medium. Even if only small amounts of colouring pigments are added, the electrical conductivity of the medium can thus collapse completely with a permanent maximum loading of the medium with pigments. If this is countered by a disproportionate increase in the proportion of conductive pigments, by contrast, clouding of the medium, watering down of the colour properties, high viscosity in any coating solutions and possibly even poor adhesion of the coating to the respective substrate must be expected.

For many areas of application, it would therefore be desirable to have available pigments which are both coloured and also have high electrical conductivity. EP 310 340 has already proposed for this purpose pigments which have a layer comprising an oxide of silicon and/or titanium and an electrically conductive layer on a core comprising iron-oxide particles.

These pigments have a specific resistance of less than $5 \times 10^6$ Ωcm and colours in the range from yellow via orange to red, which correspond to the inherent colour of the substrates. Due to the choice of substrates, however, the colour of such pigments can only be varied in tightly restricted ranges, optically variable colour impressions have not been described, and the achievable electrical conductivity is in need of improvement.

Especially for areas of application such as security products or electronic articles, however, it would be desirable to have available electrically conductive pigments of sufficiently high electrical conductivity and at the same time with an optically variable colour.

The object of the invention was therefore to develop optically variable pigments of high electrical conductivity which have the simplest possible composition, can cover a broad colour range, can be integrated well into various application media and can be produced simply and inexpensively for mass applications.

A further object of the invention consisted in the provision of a simple process for the preparation of such pigments.

In addition, a further object of the invention consisted in indicating the use of the pigments mentioned above.

The object of the invention is achieved by optically variable pigments of high conductivity which comprise a flake-form substrate, which has at least a thickness of 80 nm and consists of at least 80% by weight, based on the total weight of the substrate, of silicon dioxide and/or silicon dioxide hydrate, and an electrically conductive layer surrounding the substrate.

In addition, the object of the invention is achieved by a process for the preparation of optically variable pigments of high conductivity which comprises the following steps:
 a) optionally coating of a flake-form substrate, which has at least a thickness of 80 nm and consists of at least 80% by weight, based on the total weight of the substrate, of silicon dioxide and/or silicon oxide hydrate, with at least one layer package comprising a dielectric layer having a refractive index $n \geq 1.8$ and a dielectric layer having a refractive index $n<1.8$, where the layer having a refractive index $n \geq 1.8$ is applied directly to the substrate and optionally additionally to the layer having a refractive index $n<1.8$, with the proviso that in each case a layer having a refractive index $n<1.8$ is applied immediately below the electrically conductive layer, giving a support flake,
 b) coating of the support flake obtained in step a) on all sides with an electrically conductive layer.

Furthermore, the object of the invention is achieved by the use of the said pigments in paints, coatings, printing inks, plastics, security applications, floorcoverings, films, formulations, ceramic materials, glasses, paper, for laser marking, in heat protection, in dry preparations and pigment preparations.

The pigments according to the invention are optically variable and comprise a flake-form substrate, which consists of at least 80% by weight, based on the total weight of the substrate, of silicon dioxide and/or silicon oxide hydrate and has a minimum thickness of 80 nm, and an electrically conductive layer surrounding the substrate.

Optically variable pigments are pigments which leave behind a different visually perceptible colour and/or brightness impression at different illumination and/or viewing angles. In the case of different colour impressions, this property is known as colour flop. The optically variable pigments according to the invention preferably have at least two and at most four optically clearly distinguishable discrete colours at least two different illumination and/or viewing angles, but preferably two optically clearly distinguishable discrete colours at two different illumination and/or viewing angles or three optically clearly distinguishable discrete colours at three different illumination and/or viewing angles. Preferably, only the discrete hues and no intermediate hues are present in each case, i.e. a clear change from one colour to another colour is evident at different viewing angles. However, embodiments which exhibit a colour progression on changing the viewing angle are also suitable.

For the purposes of the present invention, flake-form is regarded as being a flat structure which has, with its top and bottom, two surfaces which are approximately parallel to one another whose length and width dimension represents the greatest dimension of the pigment. The separation between the said surfaces, which represents the thickness of the flake, has, by contrast, a smaller dimension.

The length and width dimension of the substrates for the pigments according to the invention is between 2 and 250 µm, preferably between 2 and 100 µm, and in particular between 5 and 60 µm. It also represents the value which is usually referred to as the particle size of the substrates. This is not crucial per se, but a narrow particle-size distribution of the substrates is preferred. The thickness of the substrates is at least 80 nm and up to 5 µm, preferably from 0.1 to 4.5 µm and particularly preferably from 0.2 to 1 µm.

The substrates have an aspect ratio (ratio of length to thickness) of at least 2, preferably of at least 10 and particularly preferably of at least 50.

The substrate consists of at least 80% by weight, based on the total weight of the substrate, of silicon dioxide and/or silicon oxide hydrate. In addition, it may comprise up to 20% by weight, based on the total weight of the substrate, of particulate and/or dissolved colorants. The substrate preferably consists of 95 to virtually 100% by weight of silicon oxide and/or silicon oxide hydrate, where only traces or small percentage proportions of foreign ions may be present.

Such substrates are also known as $SiO_2$ flakes, even if they comprise fractions of hydrated silicon oxide.

They are highly transparent and, if no colorants are present, colourless. They have flat and very smooth surfaces and a uniform layer thickness. Due to the preferred production process for $SiO_2$ flakes described below, they have sharp fracture edges, which may have pointed, serrated protuberances, on the side surfaces. Particular preference is given to substrates which have a narrow particle-size distribution, in particular those in which the proportion of fine particles is minimised.

The substrates are regarded as transparent if they essentially, i.e. to the extent of at least 90%, transmit visible light.

Furthermore, the pigments according to the invention comprise an electrically conductive layer, which surrounds the above-mentioned substrates.

Suitable materials for the electrically conductive layer are, in particular, doped metal oxides, where the electrically conductive layer comprises one or more thereof. The metal oxides are preferably tin oxide, zinc oxide, indium oxide and/or titanium oxide, preferably tin oxide, indium oxide and/or zinc oxide. The said metal oxides are in doped form in the conductive layer, where the doping can take place with gallium, aluminium, indium, thallium, germanium, tin, phosphorus, arsenic, antimony, selenium, tellurium, molybdenum, tungsten and/or fluorine. Individual dopants of those mentioned, but also combinations thereof, may be present in the conductive layer. Aluminium, indium, tungsten, tellurium, fluorine and/or antimony are preferably employed for doping the metal oxides. The proportion of dopants in the conductive layer can be 0.1 to 30% by weight, preferably in the range from 2 to 15% by weight. In a particularly preferred embodiment, the conductive layer employed is antimony-doped tin oxide, antimony- and tellurium-doped tin oxide, tungsten-doped tin oxide, tin-doped indium oxide, aluminium-doped zinc oxide or fluorine-doped tin oxide, where antimony-doped tin oxide is particularly preferred. The tin to antimony ratio in this preferred combination can be 4:1 to 100:1, preferably 8:1 to 50:1. Lower antimony contents adversely affect the conductivity, whereas higher antimony contents reduce the transparency of the electrically conductive layer of the pigments according to the invention.

The proportion of the electrically conductive layer, based on the flake-form substrate, can be 10 to 70% by weight and is preferably 20 to 40% by weight. If antimony-doped tin oxide is employed as material for the conductive layer, the antimony content is preferably 1 to 20 mol % and particularly preferably 5 to 15 mol %, based on the total amount of antimony oxide and tin oxide.

The electrically conductive layer has a layer thickness of 10 nm to 200 nm, preferably 20 nm to 50 nm. In general, the electrically conductive layer is so thin that the geometrical shape and aspect ratio of the substrates in the electrically conductive pigment is very substantially retained.

In accordance with the invention, at least one layer package which consists of a dielectric layer having a refractive index $n \geq 1.8$ and a dielectric layer having a refractive index $n<1.8$ may also be located between the substrate and the electrically conductive layer. The layer having a refractive index $n \geq 1.8$ is located directly on the substrate and the layer having a refractive index $n<1.8$ is located immediately below the electrically conductive layer. If two or more of the layer packages described above are present, the layer having a refractive index $n \geq 1.8$ is in addition located on all layers having a refractive index $n<1.8$ which are not located-immediately below the electrically conductive layer. At least one, but preferably a plurality of and very particularly preferably each of these layers contribute to the colour of the pigment through interference and/or inherent colour.

The pigments according to the invention preferably have only one or no layer package described above.

A layer is referred to as dielectric if it does not conduct electrical current.

If a layer package comprising dielectric layers is present, it consists of a high-refractive-index layer and a low-refractive-index layer. The dielectric layer(s) comprising a material having a refractive index $n \geq 1.8$ (high-refractive-index layers) is (are) layers which preferably consist of $TiO_2$, titanium oxide hydrate, titanium suboxides. $Fe_2O_3$, FeOOH, $SnO_2$, ZnO, $ZrO_2$, $Ce_2O_3$, CoO, $Co_3O_4$, $V_2O_5$, $Cr_2O_3$ and/or mixed phases thereof. These materials are either colourless or have an inherent colour owing to inherent absorption. Particular preference is given to $TiO_2$, titanium oxide hydrate, $Fe_2O_3$, FeOOH and $SnO_2$. Especial preference is given to $TiO_2$ and titanium oxide hydrate. Since these have a particularly high refractive index due to prior coating with tin oxide, particular preference is also given to mixed phases comprising tin oxide with $TiO_2$ and titanium oxide hydrate which form in these cases from the small amounts of tin oxide and the following layer comprising $TiO_2$ and/or titanium oxide hydrate.

The dielectric layer(s) comprising a material having a refractive index n<1.8 (low-refractive-index layers) preferably consist of $SiO_2$, silicon oxide hydrate, $Al_2O_3$, aluminium oxide hydrate, mixed phases thereof or $MgF_2$. Particular preference is given to $SiO_2$ and/or silicon oxide hydrate. As already described above, a low-refractive-index layer is in each case located immediately below the electrically conductive layer if a layer package is present.

Particular preference is given to a layer package which consists of a $TiO_2$ layer and an $SiO_2$ layer.

The layer package(s) described above does (do) not necessarily have to surround the substrate. For the preparation of the pigments according to the invention, it is sufficient for these layer packages to be formed on both sides of the substrate, i.e. to be located on the largest surfaces of the substrate. However, preference is given to the embodiments in which the layer package(s), if present, very substantially completely surround the substrate.

The layer thicknesses of the layers in the layer package are selected in such a way that at least one, but preferably all layers make an independent contribution to the colour of the pigments according to the invention, i.e. are optically active, through interference and/or inherent absorption. This contribution may consist either in the enhancement, suppression or modification of an interference colour or, additionally or alternatively, in the enhancement of the optically variable behaviour of the pigments according to the invention. The preferred layer thicknesses for high-refractive-index layers are in the range from 10 to 200 nm, particularly preferably from 20 to 180 nm, while the preferred layer thicknesses for low-refractive-index layers are in the range from 15 to 300 nm, particularly preferably from 25 to 250 nm.

The pigments according to the invention have high electrical conductivity, which, expressed through the specific resistance of the pulverulent pigment, is improved approximately by the factor 10 compared with the mica having a conductive layer which is known from the prior art. At the same time, they are optically variable, i.e. exhibit different discrete colours at different viewing angles in the application medium. This is particularly surprising in the case of the pigments according to the invention, which merely consist of the substrate described above and a surrounding electrically conductive layer located thereon. The optically variable pigments known from the prior art are usually based on a multilayered structure, in some cases quite complex, which requires very precise matching of layer thicknesses and materials of the individual layers. It was therefore in no way expected that the simple structure according to the invention comprising substrate and a single electrically conductive layer would already result in optically variable pigments of increasingly good electrical conductivity. The mechanism which results in the formation of this comparatively high electrical conductivity has not been clarified. However, it is thought that both the fact that mixed oxides do not form between the substrate and the electrically conductive layer, even in the case of heat treatment of the pigment, and also the sharp-edged, pointed side surfaces of the pigments can result in increased electrical conductivity and improved formation of conduction pathways in the application medium. This high electrical conductivity facilitates a relatively low concentration of the pigments according to the invention in the respective application medium at the same time as an optically attractive colour, which, in addition, can be varied as desired, depending on the increasing thickness of the substrate. At the same time, the pigment powder has high brightness values, which are clearly superior in attractiveness to the grey shades of electrically conductive pigments from the prior art.

Owing to their high electrical conductivity, the pigments according to the invention also exhibit specific interactions in electric and electromagnetic fields. These include, for example, the attenuation or also reflection of high-frequency electromagnetic fields and the specific modification of the electrical flow density in a dielectric coating in an electric field. This is also the case if the conductive pigments according to the invention are present in a dielectric binder below the concentration threshold at which continuous conduction pathways are able to form.

The latter is particularly advantageous for many security applications, in particular in security products which are often subjected to the influence of electromagnetic fields for the checking of security features which are otherwise invisible. The pigments according to the invention can serve here, for example, for the deflection of field lines of an alternating electric field, producing a local amplification of the electromagnetic field (a so-called hot spot). With the aid of these hot spots, electroluminescent substances, for example, can be caused to luminesce.

The pigments according to the invention can be obtained with the aid of a simple and inexpensive preparation process.

The present invention therefore also relates to a process for the preparation of optically variable pigments comprising the following steps:

a) optionally coating of a flake-form substrate, which has at least a thickness of 80 nm and consists of at least 80% by weight, based on the total weight of the substrate, of silicon dioxide and/or silicon oxide hydrate, with at least one layer package comprising a dielectric layer having a refractive index $n \geq 1.8$ and a dielectric layer having a refractive index n<1.8, where the layer having a refractive index $n \geq 1.8$ is applied directly to the substrate and optionally additionally to the layer having a refractive index n<1.8, with the proviso that in each case a layer having a refractive index n<1.8 is applied immediately below the electrically conductive layer, giving a support flake, b) coating of the support flake obtained in step a) on all sides with an electrically conductive layer.

Although it is possible to carry out the coating of the substrate in step a) in such a way that only the large surfaces of the substrate are each covered by the coating, for example by means of a CVD or PVD process or if the substrate is produced jointly with the coating in a belt process, preference is nevertheless given to processes in which the coating of the flake-form substrate in steps a) and/or b) is carried out by the sol-gel process or by wet-chemical methods from inorganic starting materials.

Due to the simplicity of the process and the good availability of starting materials, it is particularly preferred for the coating of the substrate in steps a) and/or b) to be carried out by wet-chemical methods from inorganic starting materials.

The electrically conductive layer applied in step b) is preferably an antimony-doped tin oxide.

The flake-form substrates employed in accordance with the invention are advantageously produced by the belt process described in WO 93/08237, which is incorporated herein in its full scope by way of reference. Suitable starting materials for the production of $SiO_2$ flakes are, in particular, sodium or potassium water-glass solutions, which are applied to a continuous belt, dried, detached from the belt in flake form, treated with water and acid, and optionally washed, dried, calcined and optionally ground and/or classified.

The starting materials may additionally comprise network formers, surface-active substances, viscosity enhancers, further additives and particulate and/or dissolved colorants. These are likewise described in greater detail in WO 93/08237.

With the aid of the process described, $SiO_2$ flakes having a uniform layer thickness and sharp fracture edges can be produced. When setting the layer thickness, it should be noted that a layer-thickness reduction to about 1/10 of the applied wet layer thickness takes place during drying in the case of an approximately 15% water-glass solution. The wet layer thickness for the production of the substrates for the pigments according to the invention must therefore be at least 800 nm, but preferably at least 1 μm.

Either the resultant substrates or alternatively the pigments in accordance with the present invention which are provided with an electrically conductive layer are advantageously subjected to classification, which reduces the proportion of fine particles and achieves a narrow particle-size distribution of the substrates or pigments.

For the coating with the electrically conductive layer, a wet-chemical process with inorganic starting materials is likewise advantageously selected. Such processes are known per se. For example, the process described in EP 139 557 can be employed.

Particular preference is given to the application of an electrically conductive layer comprising antimony-doped tin oxide. The desired homogeneous distribution of tin and antimony in the conductive layer can be achieved by the metered addition of salts of tin and antimony, for example chlorides, either jointly in a solution or in two separate solutions, continuously and in a pre-determined mixing ratio of the aqueous suspension of the substrate at a suitable pH in the range from 1 to 5 and a suitable temperature of 50 to 90° C., at such a rate that hydrolysis and deposition on the flake-form substrate each take place immediately.

After completion of the coating when the desired layer thickness has been reached, the pigments are separated out of the suspension, if necessary washed and dried and generally calcined at temperatures in the range from 400° C. to 1100° C., preferably from 700° C. to 950° C.

In order to improve the conductivity, the pigments can optionally also be calcined under an inert-gas atmosphere or under a reducing atmosphere, for example under forming gas. This process is advantageous, for example, in the case of tungsten-doped tin oxide.

The resultant pigments are virtually completely transparent and have a whitish or pale powder colour. On alignment on a surface or on introduction into an application medium in which they can be aligned parallel to a surface, they exhibit colours which vary depending on the viewing angle.

For the case where one or more layer packages comprising a dielectric layer having a refractive index n≧1.8 and a dielectric layer having a refractive index n<1.8 are also to be applied between the substrate and the electrically conductive layer, suitable processes for the application thereof are all wet-chemical processes which are suitable for the coating of interference pigments and are familiar to the person skilled in the art. These have been described, for example, in the specifications DE 14 67 468, DE 19 59 998, DE 20 09 566, DE 22 14 545, DE 22 15 191, DE 22 44 298, DE 23 13 331, DE 25 22 572, DE 31 37 808, DE 31 37 809, DE 31 51 355, DE 32 11 602 and DE 32 35 017.

The present invention also relates to the use of the pigments according to the invention described above in paints, coatings, printing inks, plastics, in security applications, floorcoverings, films, formulations, ceramic materials, glasses, paper, for laser marking, in heat protection, in dry preparations or in pigment preparations.

Due to their optically variable colour behaviour, the pigments according to the invention are highly suitable, merely owing to their colour properties, for use for the pigmentation of application media of the type mentioned above. They are employed here in the same way as conventional interference pigments. However, it is particularly advantageous that, besides the attractive colour properties, they also have good electrical conductivity, which make them particularly suitable for use in industrial applications which require electrically conductive coatings and also very particularly suitable for use in various security products which occasionally require electrically conductive pigments in coatings for the checking of security features. Such security products are, for example, banknotes, cheques, credit cards, share documents, passports, identity documents, driving licences, entry tickets, revenue stamps, etc., to mention but a few.

On use of the pigments in coatings and inks, all areas of application known to the person skilled in the art are possible, such as, for example, powder coatings, automotive paints, printing inks for gravure, offset, screen or flexographic printing, and coatings in outdoor applications. For the preparation of printing inks of binders, in particular water-soluble types, but also solvent-containing types, for example based on acrylates, methacrylates, polyesters, polyurethanes, nitrocellulose, ethylcellulose, polyamide, polyvinyl butyrate, phenolic resins, melamine resins, maleic resins, starch or polyvinyl alcohol, is suitable. The coatings can be water- or solvent-based coatings, where the choice of coating constituents is subject to the general knowledge of the person skilled in the art.

The pigments according to the invention can likewise advantageously be employed for the production of conductive plastics and films, for example for conductive films and sheets, plastic containers and mouldings for all applications known to the person skilled in the art which require electrical conductivity. Suitable plastics here are all common plastics, for example thermosets and thermoplastics. The pigments according to the invention are subject to the same conditions here as conventional pearlescent or interference pigments.

Special features of the introduction into plastics are therefore described, for example, in R. Glausch, M. Kieser, R. Maisch, G. Pfaff, J. Weitzel, Perlglanzpigmente [Pearlescent Pigments], Curt Vincentz Verlag, 1996, 83 ff.

The pigments according to the invention are also suitable for the preparation of flowable pigment preparations and dry preparations which comprise one or more pigments according to the invention, optionally further pigments or colorants (see below), binders and optionally one or more additives. Dry preparations are also taken to mean preparations which comprise 0 to 8% by weight, preferably 2 to 8% by weight, in particular 3 to 6% by weight, of water and/or a solvent or solvent mixture. The dry preparations are preferably in the form of pearlets, pellets, granules, chips, sausages or briquettes and have particle sizes of about 0.2 to 80 mm.

It goes without saying that the pigments according to the invention can be employed, if necessary, as a mixture with further organic and/or inorganic colorants and/or electrically conductive materials in a very wide variety of application media. The mixing ratios here are in no way limited, so long as the pigment concentration in the medium is sufficiently high to achieve the desired optical and/or functional properties, but sufficiently low to avoid adversely affecting the requisite viscosity or the desired properties. They can be mixed in any ratio with commercially available additives, fillers and/or binder systems.

The pigments according to the invention have an optically variable colour behaviour and are therefore suitable for many application media which require colour properties of this type. At the same time, however, they are also electrically conductive, and are consequently capable of the production of conductive layers in the application medium. Both properties prove to be particularly advantageous on use of the pigments according to the invention in security applications, where they can serve for the generation of both visible and invisible security features. They can therefore be employed particularly advantageously in security applications for the generation of multiple security features.

The present invention will be explained below with reference to examples which describe the invention, but are not intended to restrict it.

EXAMPLE 1

100 g of $SiO_2$ flakes (thickness: 300 nm, particle size 10-50 µm) are suspended in 1900 ml of demineralised water, and the suspension is adjusted to pH 2.0 using hydrochloric acid. The $SiO_2$ flakes are coated with a layer of antimony-doped tin oxide by metering a mixture of 177.2 g of a 50% by weight aqueous $SnCl_4$ solution, 56 ml of HCl (37% by weight), 38.3 g of a 35% by weight aqueous $SbCl_3$ solution continuously into the suspension at a temperature of 75° C. with stirring. The pH is kept constant by simultaneously regulated addition of sodium hydroxide solution. After addition of the total amount of 290 ml of the solution, the reaction mixture is stirred at 75° C. for a further 30 min, subsequently cooled to room temperature with stirring and adjusted to pH 3.

The pigment obtained is filtered off via a suction filter, washed with water, dried at 140° C. and calcined at 850° C. for 30 min, giving 157.4 g of pigment powder. The Sn:Sb ratio in the coating is 85:15.

In order to measure the specific resistance of the pigment powder, an amount of 0.5 g of pigment is compressed against a metal electrode in an acrylic glass tube having a diameter of 2 cm using a metal ram with the aid of a weight of 10 kg. The electrical resistance R of the pigments pressed in this way is measured. The specific resistance ρ is obtained from the layer thickness L of the compressed pigment from the equation $$\rho = R * \pi * (d/2)^2 / L \text{ (ohm*cm)}$$

The pigment powder is bluish-white and has a powder resistance of 12 ohm*cm.

Comparative Example 100 g of mica (10-50 µm) are suspended in 1900 ml of demineralised water, and the suspension is adjusted to pH 2.0 using hydrochloric acid. The mica flakes are coated analogously to Example 1 with a layer comprising antimony-doped tin oxide. The pigment obtained is filtered off via a suction filter, washed with water, dried at 140° C. and calcined at 750° C. for min, giving 158 g of pigment powder. The Sn:Sb ratio in the coating is 85:15.

The pigment powder is pale-grey and has a powder resistance of 65 ohm*cm.

Use Example

Testing of the Conductivity in a Coating Film

The pigments from the example according to the invention (pigment 1) and the comparative example (pigment 2) are each dispersed in NC lacquer (6% of collodium and 6% of butyl acrylate in a solvent mixture). PET films with a thickness of 100 µm are each coated with the coating compositions. As blank sample, a film is coated with an NC lacquer which comprises no conductive pigments. The concentration of the pigments in the dry coating layer is about 30% by weight, based on the dry weight of the coating. The dry layer thickness of the coating layer is about 25 µm. After drying of the coating layers, the leakage resistance of the coating layer is measured in accordance with DIN 53482 with the aid of a spring-loaded tab electrode. The results are shown in Table 1.

The colour of the coating films is assessed against a black background. To this end, the coating films are stuck to a black substrate (black cardboard or film) and viewed at a steep angle (about 70 degrees, colour 1) and a flat angle (about 150 degrees, colour 2). The results can likewise be seen in Table 1.

TABLE 1

| Pigment | Surface resistance | Colour 1 | Colour 2 |
|---|---|---|---|
| 1 (invention) | 45 kohm | blue-green | purple |
| 2 (comparison) | 25 Mohm | grey | grey |
| 3 (coating without pigment) | >10 Gohm | black | black |

The comparison between pigment according to the invention and comparative pigment shows that only the pigment according to the invention exhibits good electrical conductivity and an intense angle-dependent colour at the low pigment concentration present. Whereas the electrical conductivity of the coating comprising the comparative pigment is an order of magnitude worse than that of the example according to the invention, the coating has an unattractive grey colour (black background). As expected, the coating without electrically conductive pigment has an electrical conductivity which is again orders of magnitude lower and, due to the black background, has a black colour.

The invention claimed is:

1. A pigment comprising a flake-form substrate, having a thickness of at least 80 nm and at least 80% by weight, based on the total weight of the substrate, of silicon dioxide and/or silicon oxide hydrate, and an electrically conductive layer of antimony-doped tin oxide having a tin to antimony ratio of 4:1 to 100:1 surrounding the substrate, wherein the proportion of the electrically conductive layer, based on the flake-form substrate is 10 to 70% by weight.

2. The pigment according to claim 1, having at least one layer package consisting of a dielectric layer having a refractive index n≧1.8 and a dielectric layer having a refractive index n<1.8 is located between the substrate and the electrically conductive layer, where the layer having a refractive index n≧1.8 is located directly on the substrate and optionally on the layer having a refractive index n<1.8, with the proviso that a layer having a refractive index n<1.8 is in each case arranged immediately below the electrically conductive layer.

3. The pigment according to claim 2, wherein the dielectric layer a material having a refractive index n≧1.8 consisting of $TiO_2$, titanium oxide hydrate, titanium suboxides, $Fe_2O_3$, FeOOH, $SnO_2$, ZnO, $ZrO_2$, $Ce_2O_3$, CoO, $Co_3O_4$, $V_2O_5$, $Cr_2O_3$ and/or mixed phases thereof.

4. The pigment according to claim 2, wherein the dielectric layer is a material having a refractive index n<1.8 consisting of $SiO_2$, silicon oxide hydrate, $Al_2O_3$, aluminium oxide hydrate, mixed phases thereof or $MgF_2$.

5. The pigment according to claim 1, wherein the substrate is an $SiO_2$ flake.

6. The pigment according to claim 1, wherein the substrate additionally comprises particulate and/or dissolved colorants in a proportion of up to 20% by weight, based on the total weight of the substrate.

7. A process for the preparation of optically variable pigments according to claim 1, comprising the following steps:
  a) optionally coating of a flake-form substrate, which has at least a thickness of 80 nm and at least 80% by weight, based on the total weight of the substrate, of silicon dioxide and/or silicon oxide hydrate, with at least one layer package comprising a dielectric layer having a refractive index n≧1.8 and a dielectric layer having a refractive index n<1.8, where the layer having a refractive index n≧1.8 is applied directly to the substrate and optionally additionally to the layer having a refractive index n<1.8, with the proviso that in each case a layer having a refractive index n<1.8 is applied immediately below the electrically conductive layer, giving a support flake,
  b) coating of the support flake obtained in step a) on all sides with an electrically conductive layer comprising antimony-doped tin oxide having a tin to antimony ratio of 4:1 to 100:1, wherein the proportion of the electrically conductive layer, based on the flake-form substrate, is 10 to 70% by weight.

8. The process according to claim 7, wherein the coating of the flake-form substrate is carried out by a sol-gel process or by wet-chemical methods from inorganic starting materials.

9. A method comprising using pigments according to claim 1 in paints, coatings, printing inks, plastics, in security applications, floorcoverings, films, formulations, ceramic materials, glasses, paper, for laser marking, in heat protection, in dry preparations or in pigment preparations.

10. A method according to claim 9, wherein the pigments are employed as a mixture with organic and/or inorganic colorants and/or other electrically conductive materials.

\* \* \* \* \*

UNITED STATES PATENT AND TRADEMARK OFFICE
CERTIFICATE OF CORRECTION

PATENT NO. : 8,454,861 B2
APPLICATION NO. : 12/809413
DATED : June 4, 2013
INVENTOR(S) : Krietsch et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 285 days.

Signed and Sealed this
Eighth Day of September, 2015

Michelle K. Lee
*Director of the United States Patent and Trademark Office*